July 12, 1927.

B. A. BRISTOW 1,635,457

HYDRAULIC POWER APPARATUS

Filed Dec. 19, 1924  2 Sheets-Sheet 1

INVENTOR.
B. A. Bristow.
BY J. Edward Maybee
ATTY.

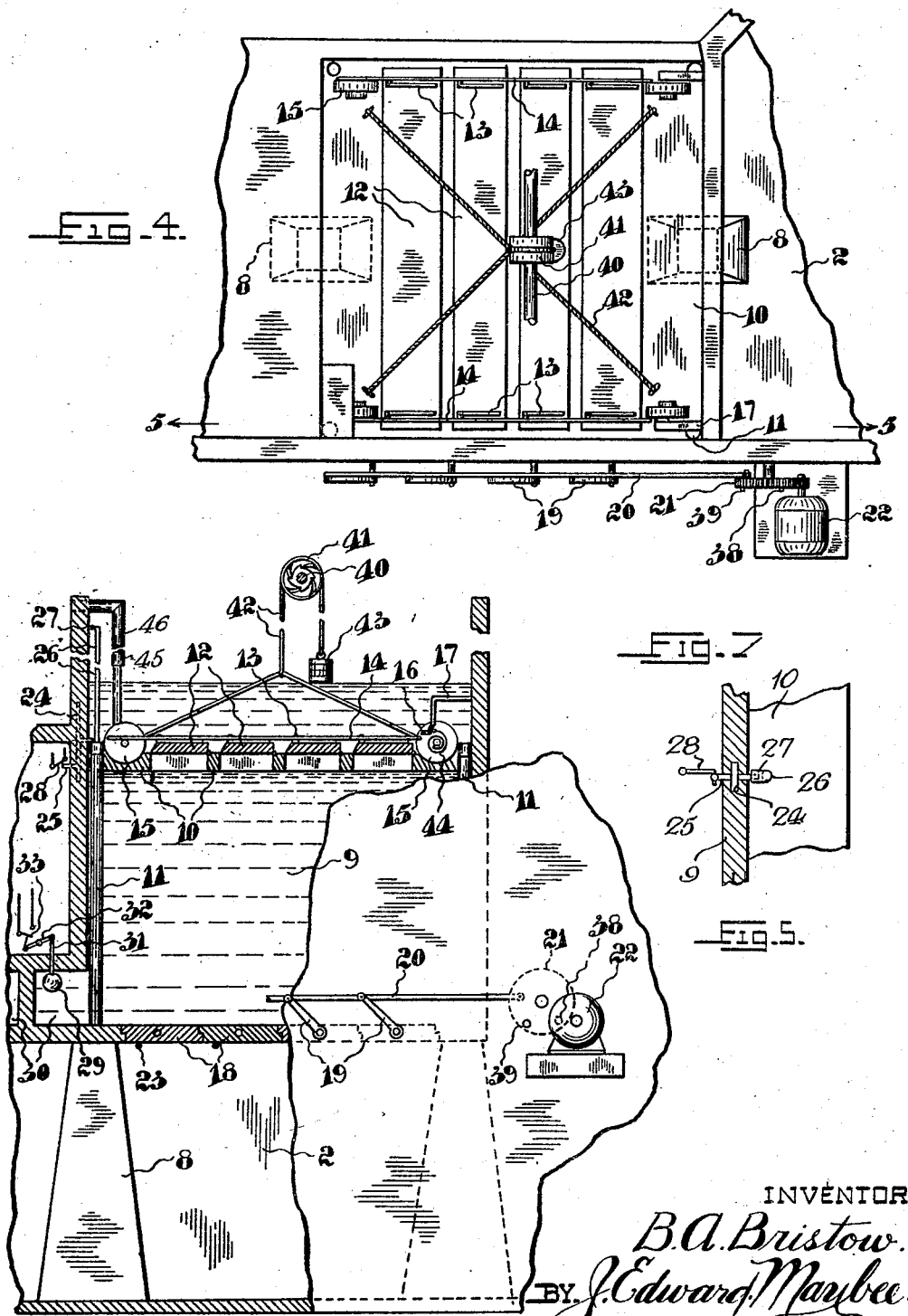

Patented July 12, 1927.

1,635,457

UNITED STATES PATENT OFFICE.

BRUCE ALFRED BRISTOW, OF TORONTO, ONTARIO, CANADA.

HYDRAULIC POWER APPARATUS.

Application filed December 19, 1924. Serial No. 757,000.

The chief object in the present invention is to devise hydraulic power apparatus which is adapted for developing a continuous output of power from tidal fluctuations and from higher heads of water, but which may also be used in connection with very low heads of water in rivers where the flow is relatively large.

A portion of the apparatus employed is along the lines of that disclosed in my prior Patent 1,502,901, issued July 29th, 1924, but I have found it desirable for my present purposes to make certain alterations therein whereby more rapid operation of the apparatus may be obtained.

Figure 1:
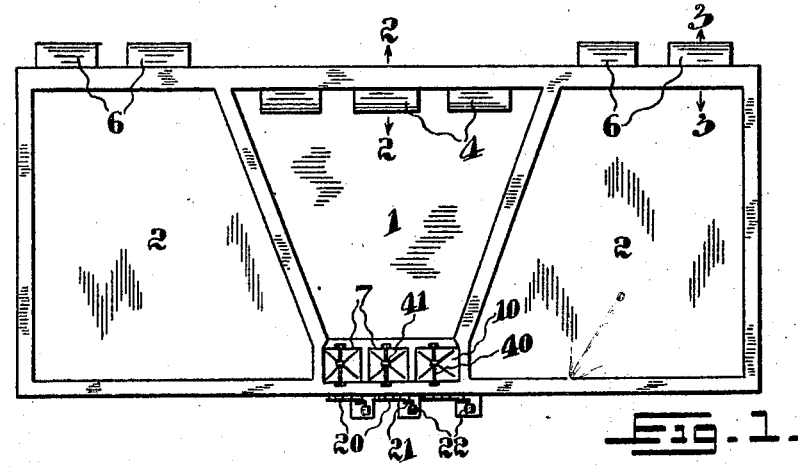
Figures 2, 3:
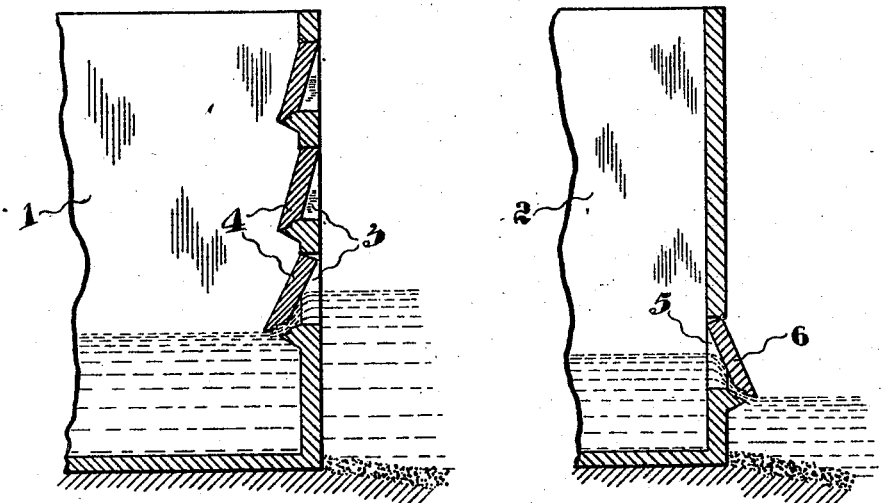
Figure 6:
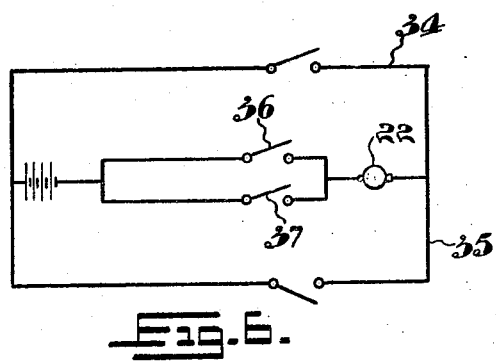

The apparatus is constructed substantially as hereinafter more specifically described and illustrated in the accompanying drawings in which Fig. 1 is a plan view of my apparatus;

Fig. 2 a vertical sectional view of the seaward wall on the line 2—2 in Fig. 1;

Fig. 3 a similar view taken on the line 3—3 in Fig. 1;

Fig. 4 a plan view of one of the power developing units;

Fig. 5 a front view, partly broken away, on line 5—5 in Fig. 4;

Fig. 6 a diagrammatic view of the electric control mechanism; and

Fig. 7 a horizontal section of part of a power developing unit.

In the drawings like numerals of reference indicate corresponding parts in the different figures.

My apparatus comprises a storage reservoir 1 in which the tidal waters may be collected at high tide and stored for use in developing power after the tide has ebbed, and one or more discharge chambers 2. In the drawings I show two such discharge chambers. The seaward wall of the storage reservoir is provided with a series of openings 3 through which water may enter. These openings are controlled by gates 4, which are pivoted adjacent the upper sides of the openings so that they normally lie in closed position. As the tide rises in front of the seaward wall, the gates are one by one forced open by pressure of the water so that the water enters the storage reservoir 1. As soon, however, as the water in the storage reservoir has risen sufficiently that there is an equal water pressure on both sides of a gate, that gate will automatically close, and each gate will in turn open and allow water to enter until the water in the reservoir is substantially equal to the rise of the tide. It will be noted, however, from Fig. 2 of the drawings that the gates 4 are prevented from swinging outwardly and as the water in front of the seaward wall falls, the pressure of the water within the receptacle holds the gates closed so that the water cannot escape.

Similarly the seaward wall of the discharge receptacles 2 are provided with openings 5 for the escape of water, which openings are controlled by gates 6, which are also pivoted adjacent the upper sides of the openings so that the gates normally lie in closed position. These gates 6, however, are arranged to open outwardly and therefore the pressure of the tidal water will hold them closed and thus prevent the flow of water into the discharge chambers, but as the tide ebbs the pressure of the water within the discharge chamber will be sufficient to force the gates open to allow the water to escape. The wall of the discharge receptacles must, of necessity, be as high as the highest point of rise of the tide, otherwise they would fill during high tide.

Positioned at one side of the receptacle 1 are a series of power generating units 7, one of which is shown in detail in Figs. 4 and 5. As shown in Fig. 5, the bottoms of these power generating units are somewhat higher than the bottoms of the chambers 2 into which they discharge. These power generating units are supported on suitable supports 8. These power generating units are shown located in one end of the reservoir 1 and are normally entirely submerged in the water, as indicated in Fig. 5.

Each power generating unit 7 comprises a casing 9 the top of which is considerably lower than the top of the sides of the reservoir 1 and into which water is adapted to flow from above the said reservoir 1 when the water in the latter is higher than the walls of the casings 9. Vertically movable in this casing is the power member 10 which is formed as a piston-like float. Suitable guides, such as 11, may be provided within the casing 9 for maintaining the power member in position, and preventing frictional contact between the sides of the power member and the wall of the casing.

Power is generated by means of apparatus actuated by the power member, which is caused to move up and down by alternately allowing water from the reservoir to enter the casing 9 and then allowing said water to escape.

The power member is formed of a skeleton framework having a plurality of openings therein, each of which openings is provided with a gate 12 pivoted on the framework at one side of the opening.

These gates will preferably be built of such material or of such construction that they are in themselves slightly buoyant, and have a tendency to move to open position, but to ensure that they will open when desired I preferably form a crank 13 on each pivot member, which cranks are pivotally connected with a connecting rod 14. These connecting rods are connected with crank disks 15 rotatably mounted on the skeleton framework. Springs 44, each connected at one end to the framework and at its other end to a disk, tend to rotate the disks when wound up, and thus actuate the connecting rods to open the gates 12. These springs, however, must of necessity be very light, as otherwise they would interfere too much with the closing of the gates.

For the purpose of closing the gates I form on the crank disks 15 projections 16, which projections engage stops 17 secured to the casing, which causes sufficient rotation of the crank disks to close the gates just as the power member reaches the limit of its upward travel. This rotation of the disks 15 causes the springs to be wound up.

As above suggested power is developed on the downward travel of the power member 10, and, in order that the water may be quickly emptied from the casing below the power member, to cause the rapid fall of the power member under the weight of the water above it, I provide the bottom of the casing 9 with special quick-opening closure means, which I will now describe. This closure means comprises a series of pivoted gates 18. These gates are rabbeted at the upper and lower corner of either side and adapted to co-operate with similar rabbeting in the bottom of the casing in the adjoining gate. The pivot points are so arranged that when the gates are in closed position a substantially equal portion of the upper surface of the gate lies at each side of the axis on which the gate swings. The gate pivots are provided with cranks 19, which cranks are all pivotally connected with a connecting rod 20, which is actuated by means of a crank disk 21 driven from an electric motor 22. Stops 23 are, however, provided to limit the movement of the gates 18. This motor 22 is controlled by means of the following mechanism. Vertically movable in a guide 24 formed in the wall of the casing 9 is a switch actuating member 25. The inner end of this member is in the path of the power member 10, so that as the power member rises the member 25 will be lifted, but this member will not fall of its own accord with the power member because of the friction with the guide 24 in which it is fitted, I may if desired provide other means for retaining the switch member 25 in its lifted position. I provide on the power member the rod 26, which rod is provided with a shoulder 27, which is adapted to engage and move the member 25 downwardly just as the power member reaches the limit of its desirable downward movement. The other end of the switch-actuating member 25 as it moves upwardly is adapted to close a switch 28 in the circuit 34 in which the motor 22 is located, and to open said switch as it moves downwardly.

As the motor 22 need only operate sufficiently long to open or close the gates 18, I therefore provide means for shutting off the motor when this has been accomplished, but first I will describe the means for starting the motor to close the gates 18. This comprises a float 29 located in a recess 30 at the side of the casing 9. A stem 31 extends through the top of this recess, which stem actuates a lever 32 outside the recess, which in turn is adapted to actuate a switch 33. It will thus be seen that as the float 29 falls the switch is closed and as it rises the switch is opened. This switch is located in a second circuit 35 in which the motor 22 is located.

In the circuit 34 is located a switch 36 which is adapted to break said circuit 34 when the gates 18 have been opened, while in the circuit 35 is located a switch 37 which is adapted to break the circuit 35 when the gates 18 have been closed. Preferably these switches 36 and 37 are operated simultaneously, that is to say, when the switch 36 is opened the switch 37 is closed and vice versa. These switches 36 and 37 are operated by means of projections on the crank disk 21, the projection 38 actuating said switches when the gates 18 have reached the closed position and the projection 39 actuating said switches when the gates 18 have reached the fully opened position.

The operation of the apparatus is as follows. Assuming the reservoir and discharge chambers to be empty and the power members on their lowered position, as the tide rises, the reservoir 1 fills with water, and when the water in the reservoir 1 reaches a sufficient height the water will overflow into the casings 9 of the power generating units. The power member 10, as the result of its buoyancy, naturally rises, its gates 12 being in open position. When the power member 10 about reaches its limit of upward movement, the projections 16 on the crank disks 25 engage the stops 17 and the crank disks caused to revolve and the gates 12 are thus closed. Simultaneously with the closing of the gates 12, the switch actuating member 25 has been actuated to close the switch 28 and the circuit 34 closed and the motor set in motion and thus the gates 18 are opened. As soon as the crank disk 21 has moved sufficiently to open the gates 18, the projection 38 opens the switch 36, and the motor is thus stopped, while at the same time the switch 37 is closed.

The water is then escaping through the bottom of the casing 9 and on account of the pressure above it the power member descends. When the water below the power member has dropped sufficiently low, the float 29 drops, and through its connections the switch 33 is closed and the motor set in operation to close the gates. Upon the gates being closed, the switch 37 is opened by means of the projection 39 to shut down the motor, while at the same time the switch 36 is closed, and the power member is once more in position to again go through the operation aforesaid.

The water discharged from the power generating unit passes into the chambers 2, where it is stored until such time as the tide falls and relieves the pressure in front of the gates 6, and allows them to open. The chambers 2 are preferably considerably larger in area than the reservoir 1.

As stated above, power is generated on the downward stroke of the power member, and the movement of this power member may be converted into rotary movement in any convenient manner. I show, for example, a shaft 40 on which a pulley 41 is secured, which pulley is rotated by means of a belt or rope 42 having a weight 43 on one end thereof. The other end of this belt or rope is secured to cables secured at different points to the power member 10. The main purpose of the weight 43 is merely to counterbalance the weight of the cables 44 when the power member moves upwardly.

While I do not desire to restrict myself, I deem it important that the range of vertical movement of the crib be less than the available fall. For instance, I consider that a range of movement of about two feet is best no matter what the available head may be.

As the power member 10 will probably not drop as fast as the water below it escapes on account of being held by the belt 42, I preferably provide means for allowing air to enter the space below the power member. This means comprises a vent comprising members 45 and 46 adapted to telescope on one another. The member 45 extends through to the lower side of the power member and the member 46 extends through the side of the casing 9 to the outer air. This vent also provides means for the escape of air after the gates 18 are closed and the casing is being refilled.

It will thus be seen that I have devised apparatus by means of which a suitable quantity of water may be stored and thus used to generate power until the next rise of the subsequent tide.

What I claim is:

1. A hydraulic power device comprising a reservoir having sides and a bottom; a chamber communicating with said reservoir; a power member vertically movable in said chamber, said power member having a passage therethrough, said chamber having an outlet in its bottom; gates controlling said passage; and a plurality of gate members pivoted in the bottom and controlling said outlet.

2. A hydraulic power device comprising a reservoir having sides and a bottom; a chamber communcating with said reservoir; a power member vertically movable in said chamber, said power member having a passage therethrough, said chamber having an outlet in its bottom; gates controlling said passage; a plurality of gate members pivoted in the bottom and controlling said outlet; and operating means connecting said last mentioned gate members whereby they may be simultaneously actuated.

3. A hydraulic power device comprising a reservoir having sides and a bottom; a chamber communicating with said reservoir; a power member vertically movable in said chamber, said power member having a passage therethrough, said chamber having an outlet in its bottom; gates controlling said passage; a plurality of gate members pivoted in the bottom and controlling said outlet; operating means connecting said last mentioned gate members whereby they may be simultaneously actuated; means for setting in motion said operating means to open the gates just as the power member reaches the limit of its upward movement; and means for setting in motion said operating means to close the last mentioned gate members as the power member approaches the limit of its downward movement.

4. A hydraulic power device comprising a reservoir having sides and a bottom; a chamber communicating with said reservoir; a power member vertically movable in said chamber, said power member having a passage therethrough, said chamber having an outlet in its bottom; gates controlling said passage; a plurality of gate members pivoted in the bottom and controlling said outlet; operating means connecting said last mentioned gate members whereby they may be simultaneously actuated; means actuated by the power member for setting in motion said operating means to open the last mentioned gate members just as the power member reaches the limit of its upward movement; and float-controlled means for setting in motion said operating means to close the last mentioned gate members as the power member approaches the limit of its downward movement.

5. A hydraulic power device comprising a reservoir having sides and a bottom; a chamber communicating with said reservoir; a power member vertically movable in said chamber, said power member having a passage therethrough, said chamber having an outlet in its bottom; gates controlling said passage; and a plurality of gate members pivoted in the bottom and controlling said outlet, the axes on which the last mentioned gate members swing being substantially midway of the upper surface of the last mentioned gate member when in closed position.

6. A hydraulic power device comprising a reservoir having sides and a bottom; a chamber in communication with said reservoir; a power member vertically movable in said chamber, said power member having a passage therethrough, said chamber having an outlet in its bottom; gates controlling said passage; and a plurality of gate members pivoted in the bottom and controlling said outlet, said last mentioned gate members having rabbeted sides at the upper and lower corner of either side adapted to co-operate with the rabbeted sides of the adjoining gate member, the axes on which the gates swing being substantially midway of the upper surface of the gate members when in the closed position.

7. A hydraulic power device comprising a reservoir having sides and a bottom; a chamber in communication with said reservoir; a power member vertically movable in said chamber, said power member having a gate-controlled passage therethrough, said chamber having an outlet in its bottom; and a plurality of gate members pivoted in the bottom and controlling said outlet; and means for admitting air beneath the power member.

Signed at Toronto, Canada, this fifteenth day of December, 1924.

BRUCE ALFRED BRISTOW.